(12) United States Patent
Wang et al.

(10) Patent No.: US 10,469,606 B2
(45) Date of Patent: Nov. 5, 2019

(54) METHOD FOR WEB SERVICE SUPPORTING SYNCHRONOUS HOSTING OF MULTIPLE DEVICES

(71) Applicants: INSTITUTE OF ACOUSTICS, CHINESE ACADEMY OF SCIENCES, Beijing (CN); BEIJING HILI TECHNOLOGY CO. LTD, Beijing (CN)

(72) Inventors: Jinlin Wang, Beijing (CN); Linlin Hu, Beijing (CN); Zhichuan Guo, Beijing (CN); Shoujiang Dang, Beijing (CN); Wu Zhang, Beijing (CN); Ziqiang Huan, Beijing (CN)

(73) Assignees: INSTITUTE OF ACOUSTICS, CHINESE ACADEMY OF SCIENCES, Beijing (CN); BEIJING HILI TECHNOLOGY CO., LTD., Beijing (CN)

(*) Notice: Subject to any disclaimer, the term of this patent is extended or adjusted under 35 U.S.C. 154(b) by 452 days.

(21) Appl. No.: 15/101,822

(22) PCT Filed: Apr. 10, 2014

(86) PCT No.: PCT/CN2014/075029
§ 371 (c)(1),
(2) Date: Jun. 3, 2016

(87) PCT Pub. No.: WO2015/081647
PCT Pub. Date: Jun. 11, 2015

(65) Prior Publication Data
US 2016/0316033 A1    Oct. 27, 2016

(30) Foreign Application Priority Data
Dec. 3, 2013 (CN) .......................... 2013 1 0642383

(51) Int. Cl.
*H04L 29/08* (2006.01)

(52) U.S. Cl.
CPC .............. *H04L 67/26* (2013.01); *H04L 67/02* (2013.01); *H04L 67/04* (2013.01); *H04L 67/10* (2013.01);
(Continued)

(58) Field of Classification Search
CPC ....... H04L 67/26; H04L 67/02; H04L 67/146; H04L 67/303; H04L 67/04; H04L 67/10; H04L 67/16
(Continued)

(56) References Cited

U.S. PATENT DOCUMENTS 6,167,441 A * 12/2000 Himmel .................. H04L 29/06
  709/217
6,457,045 B1 * 9/2002 Hanson ................ G06Q 10/107
  707/999.01
(Continued)

FOREIGN PATENT DOCUMENTS

| CN | 102314467 A | 1/2012 |
| CN | 102637193 A | 8/2012 |
| CN | 103116585 A | 5/2013 |

OTHER PUBLICATIONS

Translation of International Search Report for International Application No. PCT/CN2014/075029, dated Sep. 4, 2014.

*Primary Examiner* — Madhu Woolcock
(74) *Attorney, Agent, or Firm* — Gokalp Bayramoglu

(57) ABSTRACT

The present invention relates to a method for a web service supporting synchronous hosting of multiple devices, comprising: a webpage of a web service includes a plurality of subservices corresponding to different types of terminal devices; when the web service is requested, the request is split between the subservices having synchronous relations and pushed to the terminal devices. The web server can
(Continued)

simultaneously host and push related content to a plurality of connected devices, and can control a plurality of devices, the service logic between the pluralities of devices being determined when designed by the web service.

7 Claims, 2 Drawing Sheets

(52) U.S. Cl.
CPC ............ *H04L 67/146* (2013.01); *H04L 67/16* (2013.01); *H04L 67/303* (2013.01)

(58) Field of Classification Search
USPC ....... 709/203, 205, 206, 219, 231, 232, 246, 709/248, 230, 236, 227
See application file for complete search history.

(56) References Cited

U.S. PATENT DOCUMENTS

| | | | |
|---|---|---|---|
| 8,225,191 B1 | 7/2012 | Kalman | |
| 8,320,558 B1* | 11/2012 | Zea | H04L 63/0428 380/278 |
| 9,414,114 B2* | 8/2016 | Ariantaj | H04N 21/2668 |
| 9,497,500 B1* | 11/2016 | Robinson | H04N 21/812 |
| 9,560,110 B1* | 1/2017 | Lewis | H04L 67/02 |
| 9,602,576 B2* | 3/2017 | Kruglick | G06F 3/04847 |
| 9,973,371 B1* | 5/2018 | Upadhyay | H04L 67/36 |
| 2002/0080161 A1* | 6/2002 | St. Maurice | H04N 7/163 715/719 |
| 2003/0061371 A1* | 3/2003 | Deshpande | H04L 29/06027 709/232 |
| 2004/0083291 A1* | 4/2004 | Pessi | H04L 65/605 709/227 |
| 2007/0157260 A1* | 7/2007 | Walker | H04N 7/163 725/86 |
| 2009/0119598 A1* | 5/2009 | Oztaskent | G06F 16/9577 715/733 |
| 2009/0328228 A1* | 12/2009 | Schnell | G06F 21/10 726/26 |
| 2011/0217965 A1* | 9/2011 | Lee | G06F 16/275 455/414.3 |
| 2011/0252082 A1* | 10/2011 | Cobb | H04L 65/605 709/203 |
| 2012/0079541 A1* | 3/2012 | Pan | H04N 21/4126 725/62 |
| 2012/0203733 A1* | 8/2012 | Zhang | G06Q 50/01 707/600 |
| 2012/0254929 A1* | 10/2012 | Oztaskent | H04N 21/4126 725/110 |
| 2012/0265803 A1* | 10/2012 | Ha | G06F 16/9574 709/203 |
| 2014/0025727 A1* | 1/2014 | Ahn | H04L 67/1095 709/203 |

\* cited by examiner

METHOD FOR WEB SERVICE SUPPORTING SYNCHRONOUS HOSTING OF MULTIPLE DEVICES

CROSS-REFERENCE TO RELATED APPLICATION

The present application is the US national phase of International Patent Application No. PCT/CN2014/075029, filed Apr. 10, 2014, which claims priority to Chinese Application No. 201310642383.8, filed Dec. 3, 2013. The priority application, CN 201310642383.8, is hereby incorporated by reference.

TECHNICAL FIELD

The present invention relates to the field of WEB technology, and in particular to a method for WEB service supporting synchronous hosting of multiple devices.

BACKGROUND

With the continuous development of IT technologies, a user is now able to experience the same type of WEB service using various types of terminal devices. For example, the user may visit a video website through a desktop computer, a smart phone, as well as a digital television.

In the prior art, in order to meet access requirements from different types of terminal devices, a corresponding subservice is often designed for each type of the terminal devices in the design of a server-side service, and such subservice is responsible for responding to access request from its respective terminal device. Obviously, this approach in the prior art requires program developers to concurrently design a plurality of subservices for a service, which leads to drawbacks of complicated service logics, heavy workload, and high development costs. With existing technologies, once there is a need for upgrading the service on the server-side, the plurality of subservices have to be modified simultaneously, which not only causes high maintenance costs, but also a risk of making errors.

Furthermore, in the prior art, there is no synchronous relation among subservices of the same service implemented on different terminal devices. For example, when a smart phone and a digital television access the same video website (e.g., Sohu video), the two access operations are independent from each other such that if the smart phone switches to another video website (e.g., LeTV), the video website being accessed by the digital television would not be changed.

SUMMARY

An objective of the present invention is to overcome the drawback of the prior art in which there is no synchronous relation among subservices of the same WEB service implemented on different terminal devices, thereby providing a method for WEB service supporting synchronous hosting of multiple devices.

In order to achieve the above objective, the present invention provides a method for WEB service supporting synchronous hosting of multiple devices, comprising:

providing a plurality of subservices corresponding to different types of terminal devices in a page of a WEB service, splitting the WEB service into subservices with synchronous relations when the WEB service is requested, and pushing the subservices to the terminal devices.

In the above technical solution, the method further comprises the following steps:

Step 1) Storing the WEB service page in a WEB server, wherein the WEB service page is defined by a predefined way of subservice splitting and comprises a plurality of subservices with synchronous relations corresponding to different types of terminal devices;

Step 2) Binding the respective terminal devices and maintaining synchronous relations among their corresponding subservices by the WEB server when they log into the WEB server;

Step 3) Sending requests to the WEB server by a user using browsers in the terminal devices;

Step 4) Splitting the WEB service page into a plurality of subservice pages for different terminal devices by the WEB server, and returning corresponding subservice pages according to the types of the terminal devices;

Step 5) Performing processes of the subservices by the respective terminal devices according to the received corresponding subservice pages.

In the above technical solution, the method further comprises, before the step 1), a predefinition operation of setting a way of splitting a WEB service into different subservices, and assigning corresponding markers to various terminals accordingly.

In the above technical solution, in the step 1), the way of subservice splitting comprises the use of webpage tags or javascript interfaces.

In the above technical solution, the step 3) further comprises: initiating an URL address of a terminal device that is the first one logged into the WEB server by the terminal device when the user requests access to the WEB server using the browsers in the terminal devices, and pushing the starting URL address to other terminal devices having synchronous relations with the first logged terminal device by the WEB server when the WEB server discovers that these terminal devices are logged in; wherein subsequent URLs of the respective terminal devices are obtained from the received subservices, and wherein the respective terminal devices maintain session connections with the WEB server.

In the above technical solution, the step 4) further comprises: switching logic state according to the user's operation and generating subservices of the next state.

In the above technical solution, in the step 4), the splitting the WEB service page into a plurality of subservice pages for different terminal devices by the WEB server comprises: extracting the content in markers representing different types of terminal devices and adding page headers thereto to generate corresponding subservice pages when the markers are encountered in the WEB service page.

In the above technical solution, in the step 4), the content returned to the terminal devices from the WEB server further comprises hyperlink relations with other terminal devices.

The present invention has the following advantages:

A WEB server is capable of simultaneously hosting and pushing relevant content to a plurality of devices connected thereto, and controlling the plurality of devices among which service logics are determined in the design of a WEB service.

DETAILED DESCRIPTION OF THE INVENTION

The present invention will be described in further detail in conjunction with the accompanying drawings.

An introduction of the concepts involved in the present invention is provided before proceeding to a detailed description of the method of the present invention.

Synchronization: the term "synchronization" referred to in this application means that two subservices are correlated in terms of time, but are not necessarily identical in terms of content. For example, a smart phone and a smart television may simultaneously perform subservices related to a movie, in which the subservice performed by the smart television is mainly used for playing the content of the movie while the subservice performed by the smart phone is mainly used for playing an introduction of the movie, such as actors/actresses, synopsis, and audiences' comments, etc. When an audience switches the performed subservice into a subservice for another movie through the smart phone, the subservice performed by the smart television would be switched simultaneously.

With the method of the present invention, a plurality of terminal devices specified by an audience would have the above synchronization function. The implementation of the method of the present invention will be further described below in connection with various embodiments.

Figure 2:
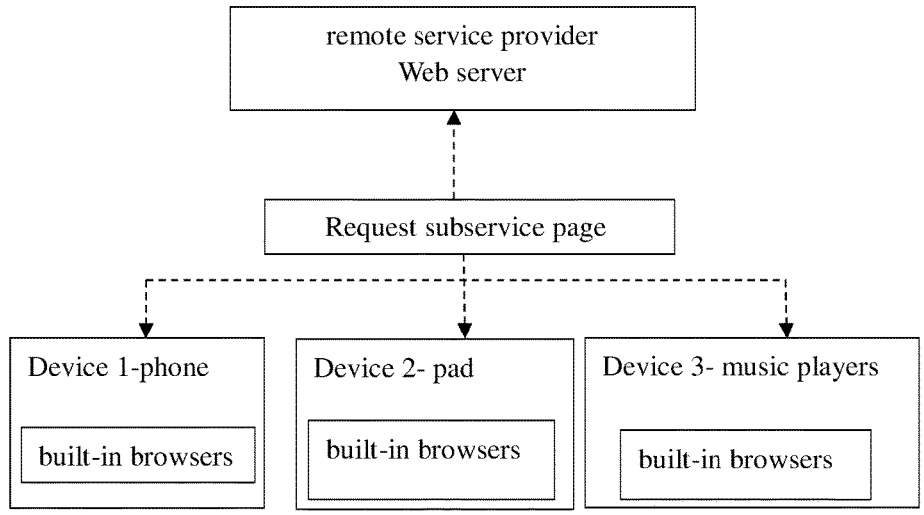
FIG. 2 is a block diagram of components of a system implementing the WEB service method supporting multi-device synchronized hosting of the present invention.

In an embodiment, the terminal devices comprise a smart phone, a tablet computer and a music player. As shown in FIG. 2, these terminal devices may be connected with a remote server through a network.

Figure 1:
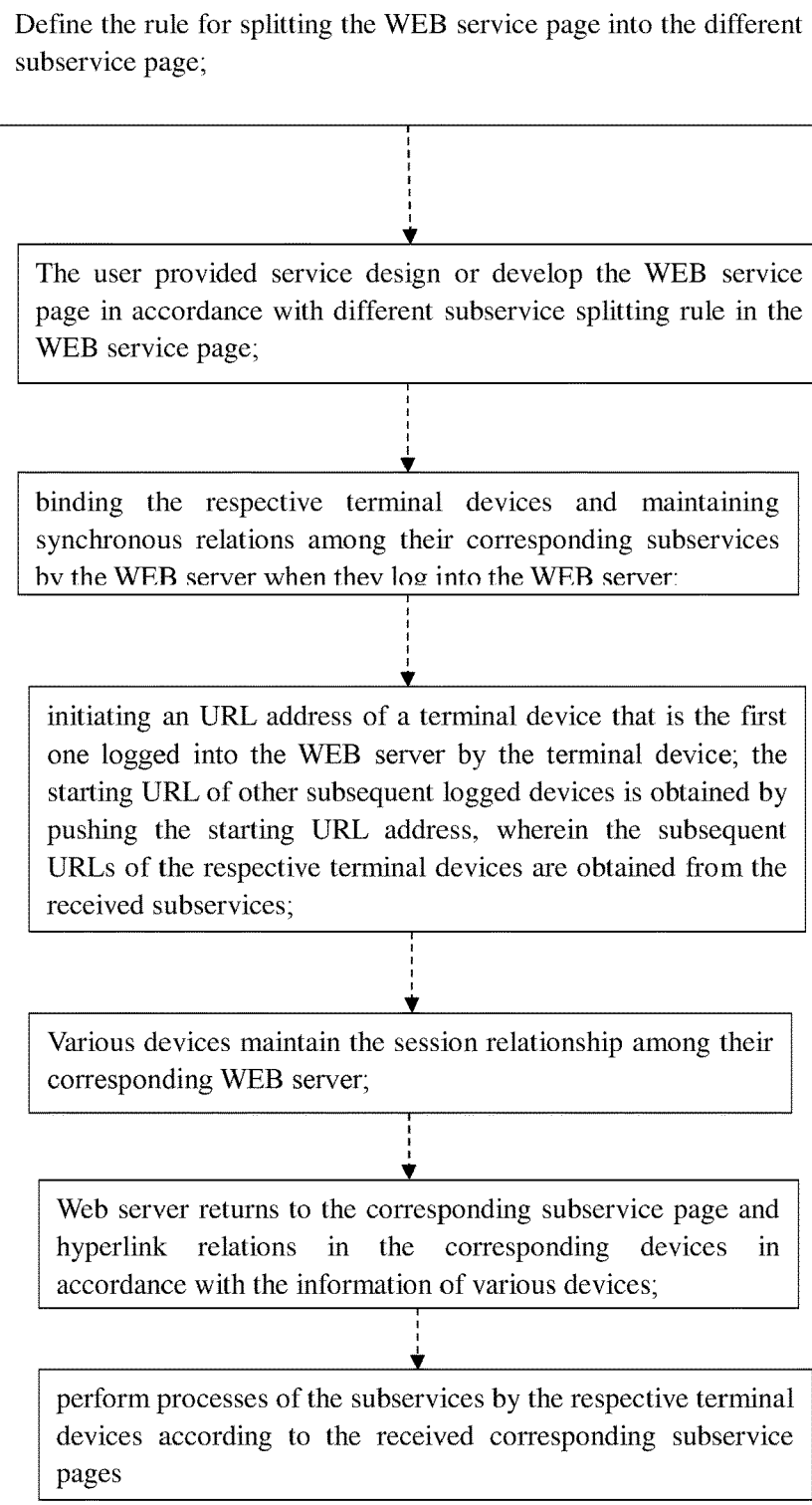
FIG. 1 is a flowchart of a WEB service method supporting multi-device synchronized hosting of the present invention.

Referring to FIG. 1, the method of the present invention comprises the following steps:

Step 1) Setting a way of splitting a WEB service into different subservices, and assigning corresponding markers to various terminals accordingly.

In the present embodiment, iframes are utilized as the way of splitting the WEB service into the different subservices, i.e., iframes are used to divide pages of different subservices, and then the respective terminal devices are assigned with corresponding iframe IDs. For example, a corresponding iframe ID for the smart phone may be iframe-phone, an iframe ID for the tablet computer may be iframe-pad, and an iframe ID for the music player may be iframe-musicplayer. In other embodiments, different subservices may also be split using existing WEB technologies or by extending corresponding webpage tags or javascript interfaces.

Step 2) Producing a WEB service page by a service provider according to the way of subservice splitting defined in step 1).

Figure 3:
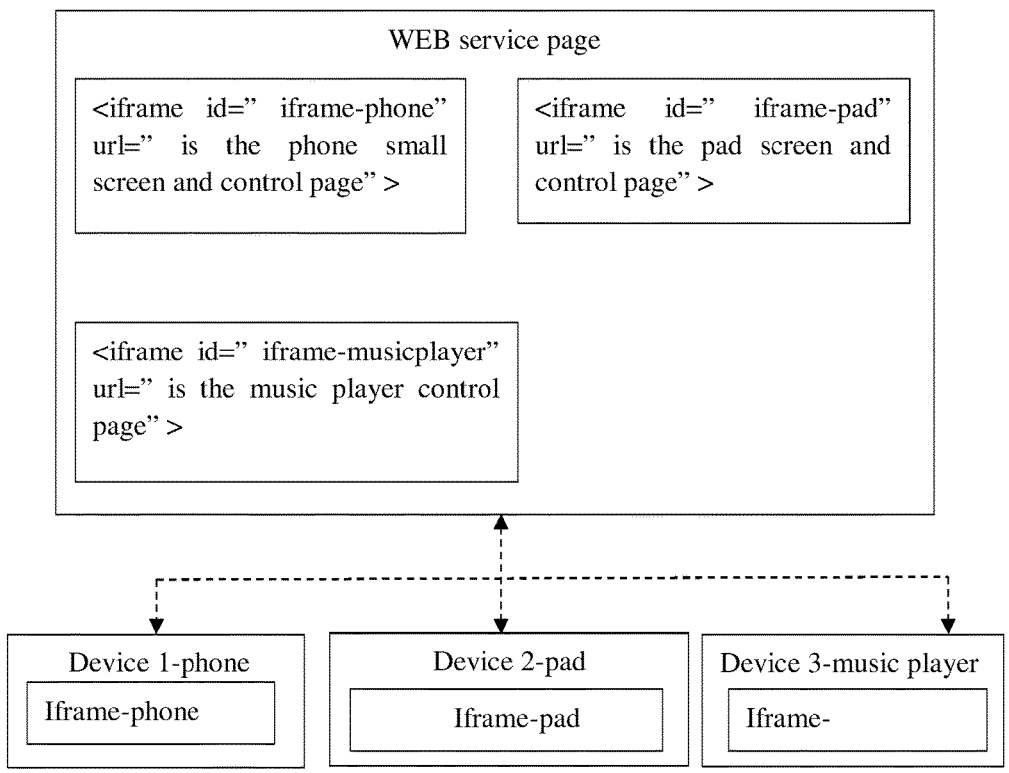
FIG. 3 is a schematic diagram of a WEB service page created according to the method of the present invention.

For example, in the present embodiment, a WEB service page of a video WEB site comprises three subservices for smart phones, tablet computers and music players, respectively. The subservice for smart phones comprises a service logic related to payment, the subservice for tablet computers comprises a service logic related to video playback, and the subservice for music players comprises a music player implemented with HTML 5 Audio. All of these subservices are contained in the same WEB service page but located within different iframe tags. The WEB service page thus produced is shown in FIG. 3.

Step 3) Binding the respective terminal devices and maintaining synchronous relations among their subservices by the WEB server after they log into the WEB server.

In this step, the binding of the respective terminal devices by the WEB server may be realized by various approaches in the prior art, such as establishing a group for terminal devices logged in with the same username by the WEB server, in which there are synchronous relations of terminal device names among subservices of the respective terminal devices in that group.

Step 4) Initiating an URL address of a terminal device that is the first one logged into the WEB server by the terminal device when the user requests access to the WEB server using built-in browsers in the terminal devices, and pushing the starting URL address to other terminal devices having synchronous relations with the first logged terminal device by the WEB server after the WEB server discovers that these terminal devices are logged in; wherein subsequent URLs of the respective terminal devices are obtained from the received subservices, and wherein the respective terminal devices maintain session connections with the WEB server Step 5) Processing the webpage created in step 2), splitting the webpage into a plurality of subservice pages for different terminal devices by the WEB server, and returning corresponding subservice pages according to the types of the terminal devices.

For example, the WEB server extracts the content in corresponding tags having IDs such as iframe-phone, iframe-pad and iframe-musicplayer, etc. when encountering such tags in processing the webpage, adds corresponding page headers to the content to generate corresponding subservice pages, and stores them into corresponding directories. The WEB server determines the types of the devices (e.g., a smart phone) according to a user agent of the built-in browsers in the devices when requesting the page, thereby returning the subservice pages corresponding to the types of the devices (e.g., iframe-phone).

In other embodiments, the content returned to the terminal devices from the WEB server further comprises, in addition to the subservice pages, hyperlink relations with other terminal devices through which it is possible to jump from one subservice to another subservice.

Step 6) Performing processes of the subservices by the respective terminal devices according to the received corresponding subservice pages.

The above is a description of the steps of the method of the present invention in one embodiment. In other embodiments, the method may also be implemented in other ways. For example, said steps 1) and 2) may not be essential operations in other embodiments; and in the case that the way of splitting the WEB service into different subservices has been set and the WEB service page has been generated, the performance of the method of the present invention may start directly from said step 3).

Finally, it should be noted that, the embodiments above are only used for illustrating, rather than limiting the technical solutions of the present invention. Although the present invention has been described in detail with reference to the embodiments, those skilled in the art should understand that modification or equivalent substitution to the technical solutions of the present invention should be covered within the scope of the claims of the present invention without departing from the spirit and scope of the technical solutions of the present invention.

The invention claimed is:

1. A method for a WEB service supporting synchronous hosting on a plurality of terminal devices, comprising:

splitting the WEB service into a plurality of subservices, each of the plurality of subservices corresponding to a different device type, wherein iframes are used for the splitting of the plurality of subservices;

assigning an iframe ID to each device type of each of the plurality of terminal devices, wherein the plurality of terminal devices are different types of devices, and wherein the frame IDs correspond with the iframes used for the splitting of the plurality of subservices;

producing a WEB service page fair the WEB service, the WEB service paage containing each of the iframes of the plurality of subservices located within a different iframe tag;

wherein the method further comprises:

storing the WEB service page in a WEB server, wherein the plurality of subservices have synchronous relations;

binding the plurality of terminal devices associated with an established group by the WEB server when the plurality of terminal devices log into the WEB server;

sending requests to the WEB server by a user using a browser on a first terminal device of the plurality of terminal devices;

based on determining an iframe ID assigned to a device type of the first terminal device according to the browser on the first terminal device, the WEB server extracting content in an iframe tag of the different iframe tags of the WEB service page corresponding with the iframe ID assigned to the device type of the first terminal device, the WEB server adding a corresponding page header to the extracted content to generate a corresponding subservice page for the device type of the first terminal device;

the WEB server pushing subservice pages corresponding to the plurality of subservices to each of the plurality of terminal devices associated with the established group according to a determined iframe ID associated with a device type for each of the plurality of terminal devices;

performing processes of the plurality of subservices by the plurality of terminal devices according to the pushed subservice pages corresponding to the plurality of subservices; and the WEB server maintaining synchronous relations among the pushed subservice pages at each of the plurality of terminal devices associated with the established group.

2. The method according to claim 1, wherein sending the requests to the WEB server comprises:

initiating a URL address of the first terminal device, wherein the first terminal device is a first one logged into the WEB server when the user requests access to the WEB server using the browser on the first terminal device, and pushing the URL address to other terminal devices of the plurality of terminal devices having synchronous relations with the first terminal device when the WEB server discovers that the other terminal devices are logged in;

wherein subsequent URLs associated with the other terminal devices associated with the pushed subservice pages are obtained, and wherein the other terminal devices maintain session connections with the WEB server.

3. The method according to claim 1, wherein splitting the WEB service comprises:

switching a logic state according to an operation of the user and generating subservices of a next state.

4. The method according to claim 3, wherein pushing the subservice pages comprises returning hyperlink relations terminal devices.

5. The method according to claim 1, wherein pushing, the subservice pages comprises returning hyperlink relations with the plurality of terminal devices.

6. The method according to claim 1, wherein, the step of binding the plurality of terminal devices by the WEB server comprises forming the established group of terminal devices logged in with a same username by the WEB server and synchronizing subservices corresponding to the plurality of terminal devices logged in with the same username forming the established group.

7. The method according to claim 1, wherein, the WEB server determines a device type of each of the plurality of terminal devices according to a user agent of built-in browsers in the plurality of terminal devices and thereby pushes the subservice pages corresponding to the plurality of subservices.

* * * * *